United States Patent
Cocchi et al.

(10) Patent No.: US 10,258,062 B2
(45) Date of Patent: Apr. 16, 2019

(54) CONNECTOR FOR CONNECTING A CONTAINER OF LIQUID OR SEMI-LIQUID FOOD PRODUCTS AND MACHINE COMPRISING SAID CONNECTOR AND CONTAINER

(71) Applicant: ALI GROUP S.r.l.—CARPIGIANI, Cernusco sul Naviglio (Milan) (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernusco sul Naviglio (IT)

( * ) Notice: Subject to any disclaimer, the term of this patent is extended or adjusted under 35 U.S.C. 154(b) by 0 days.

(21) Appl. No.: 15/934,227

(22) Filed: Mar. 23, 2018

(65) Prior Publication Data

US 2018/0271114 A1    Sep. 27, 2018

(30) Foreign Application Priority Data

Mar. 27, 2017 (IT) .......................... 102017000033574

(51) Int. Cl.
  *A23G 9/16* (2006.01)
  *A23G 9/28* (2006.01)
  (Continued)

(52) U.S. Cl.
  CPC ............. *A23G 9/166* (2013.01); *A23G 9/228* (2013.01); *A23G 9/28* (2013.01); *G01K 1/14* (2013.01);
  (Continued)

(58) Field of Classification Search
  CPC .. G01K 13/02–13/125; G01K 2207/02; H01R 13/6683; H01R 13/6691; A23G 9/00–9/288
  See application file for complete search history.

(56) References Cited

U.S. PATENT DOCUMENTS 3,745,835 A * 7/1973 Smith .................... G01K 13/10
                                                       285/93
4,551,025 A    11/1985 Ames et al.
       (Continued)

FOREIGN PATENT DOCUMENTS

EP    1096241 A1    5/2001
EP    2505070 A1    10/2012

OTHER PUBLICATIONS

Italian Search Report dated Jan. 24, 2018 for counterpart Italian Application No. IT 201700033574.

*Primary Examiner* — Nicholas J. Weiss
*Assistant Examiner* — Randall A Gruby
(74) *Attorney, Agent, or Firm* — Shuttleworth & Ingersoll, PLC; Timothy Klima

(57) ABSTRACT

A connector for connecting a deformable bag for liquid or semi-liquid products to a machine for distributing the product and includes a body with an opening passing therethrough and acting as a product outlet and connected to the machine, with a thermal sensor supported so as to be positioned inside the bag, in contact with the liquid or semi-liquid product. The sensor is fixed in a second opening that is parallel or almost parallel to the product transit opening and a connecting cable comes out of the end of the body intended to remain outside the bag. The assembly formed by the bag and the connector and the machine for distributing a liquid or semi-liquid food product supplied with the bag equipped with the connector.

19 Claims, 5 Drawing Sheets

(51) Int. Cl.
   *G01K 13/02* (2006.01)
   *G01K 1/14* (2006.01)
   *A23G 9/22* (2006.01)
   *B67D 1/00* (2006.01)
   *B67D 1/08* (2006.01)

(52) U.S. Cl.
   CPC ............ *G01K 13/02* (2013.01); *B67D 1/0004* (2013.01); *B67D 1/0807* (2013.01); *B67D 2001/0097* (2013.01); *B67D 2001/0827* (2013.01); *G01K 2207/02* (2013.01)

(56) References Cited

U.S. PATENT DOCUMENTS

| | | | |
|---|---|---|---|
| 6,637,214 B1* | 10/2003 | Leitzke | A23G 9/163 62/342 |
| 6,848,924 B2* | 2/2005 | Frisch | F16L 11/127 439/191 |
| 6,973,867 B2* | 12/2005 | Frisch | F15B 15/202 91/459 |
| 2004/0036290 A1* | 2/2004 | Bock | F16L 11/127 285/343 |
| 2010/0002745 A1* | 1/2010 | Stoll | G01D 11/245 374/143 |
| 2011/0150034 A1 | 6/2011 | Breimon | |
| 2012/0044781 A1* | 2/2012 | Bravo | A21C 1/06 366/144 |
| 2012/0057426 A1* | 3/2012 | Bravo | A21C 1/06 366/144 |
| 2012/0192584 A1* | 8/2012 | Fiaschi | A23G 9/04 62/340 |
| 2014/0269820 A1 | 9/2014 | Perrault et al. | |
| 2015/0143818 A1* | 5/2015 | Eckhoff | F28D 15/02 62/3.2 |
| 2015/0190014 A1* | 7/2015 | Farrell | A23G 9/045 426/232 |
| 2016/0025575 A1* | 1/2016 | Schork | G01K 1/14 374/179 |
| 2016/0198736 A1* | 7/2016 | Feola | A23G 9/28 222/145.1 |
| 2017/0122814 A1* | 5/2017 | Motooka | G01K 7/22 |
| 2017/0332658 A1* | 11/2017 | Mitchell | A23G 9/045 |
| 2018/0186617 A1* | 7/2018 | Cocchi | A23G 9/22 |
| 2018/0235253 A1* | 8/2018 | Tuchrelo | A23G 9/04 |
| 2018/0325246 A1* | 11/2018 | Kovac | A45F 3/20 |

* cited by examiner

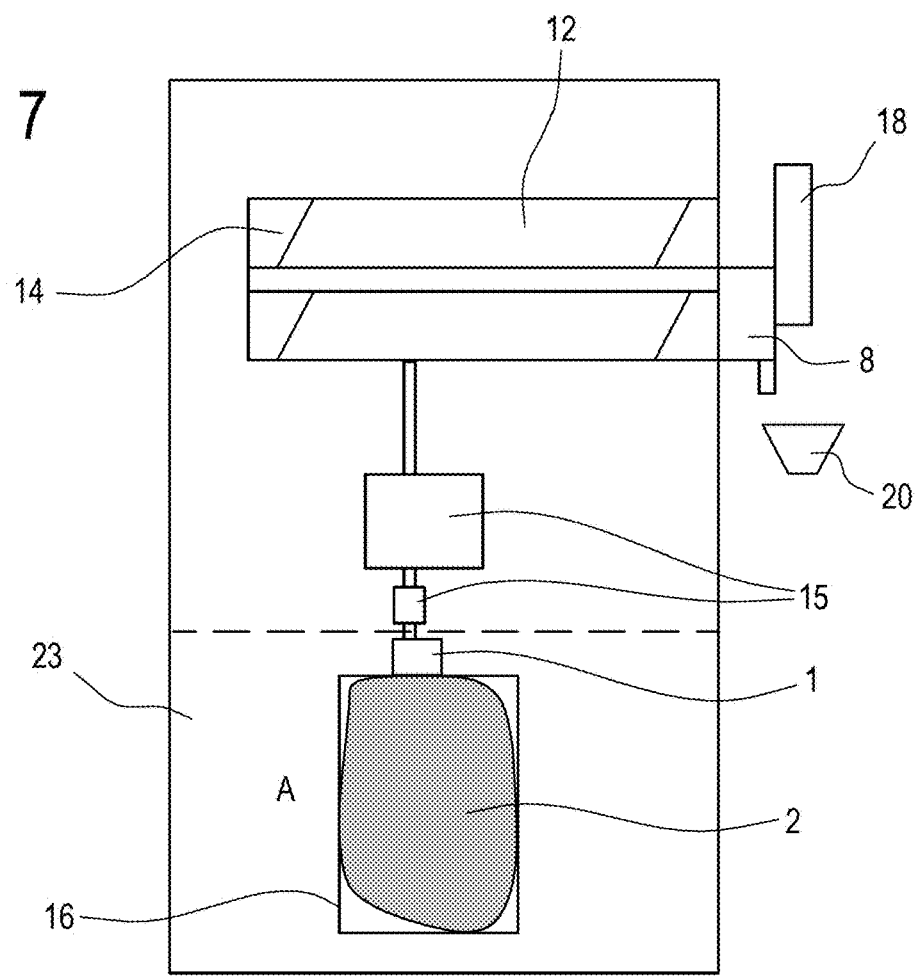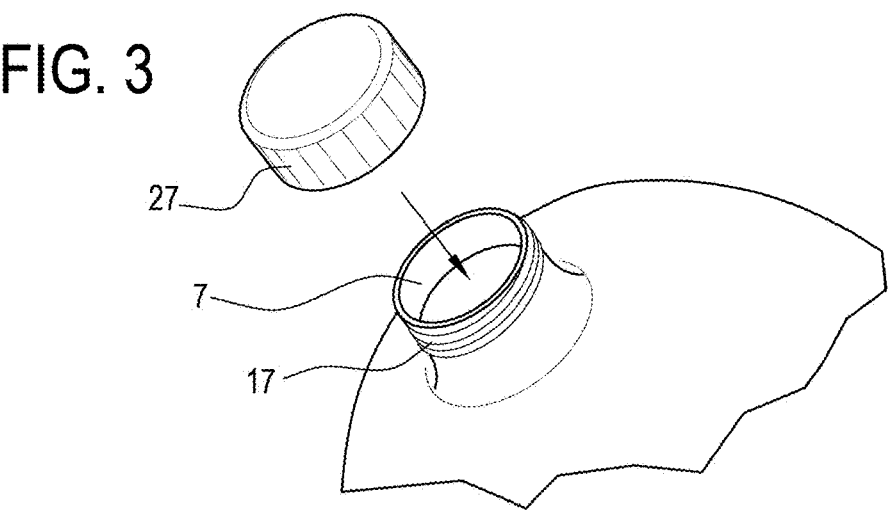

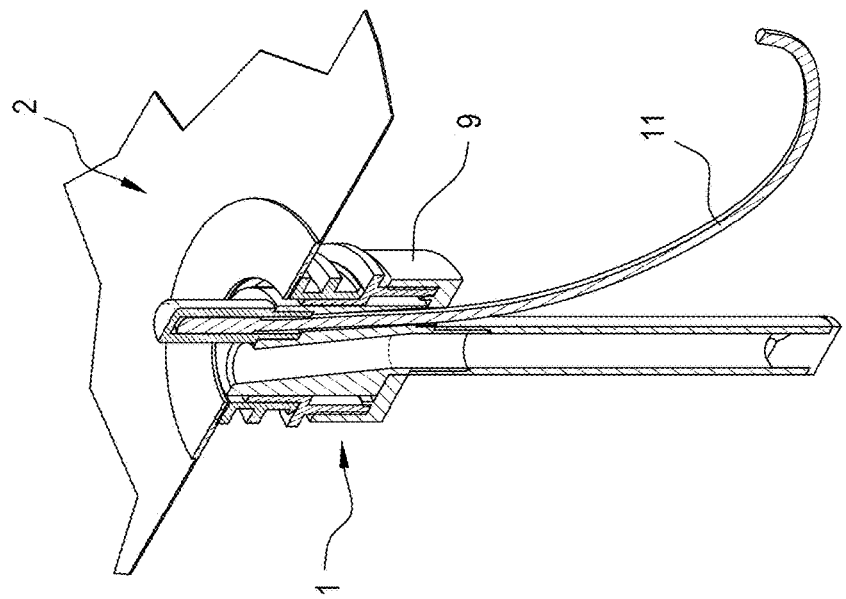
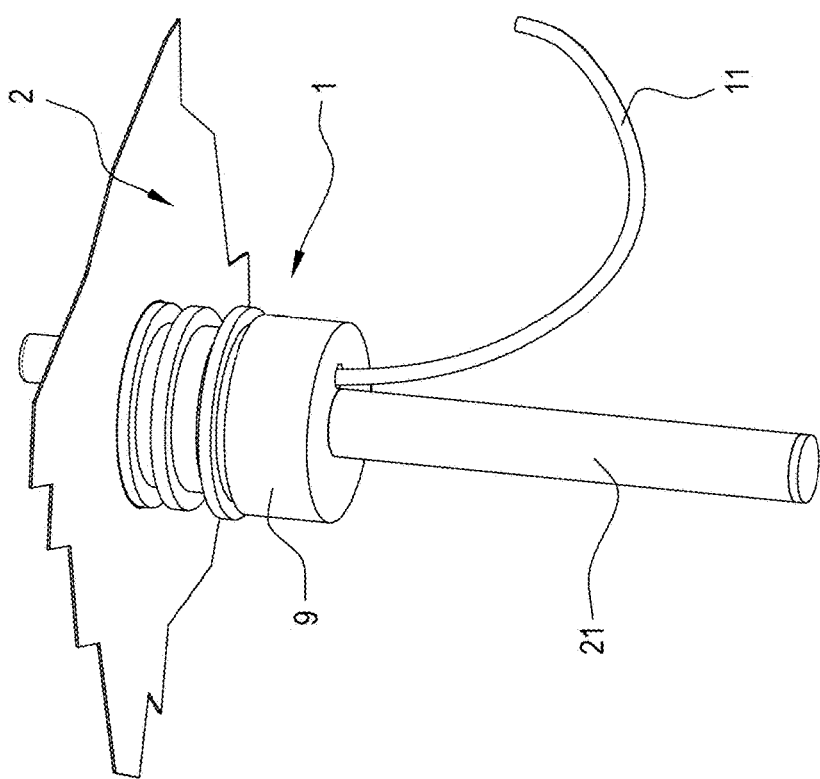

CONNECTOR FOR CONNECTING A CONTAINER OF LIQUID OR SEMI-LIQUID FOOD PRODUCTS AND MACHINE COMPRISING SAID CONNECTOR AND CONTAINER

This application claims priority to Italian Patent Application 102017000033574 filed Mar. 27, 2017, the entirety of which is incorporated by reference herein.

BACKGROUND OF THE INVENTION

This invention relates to the technical sector of machines set up for treating and distributing to the public food products, in particular liquid or semi-liquid food products.

More specifically, this invention relates to a connector used for the connection of containers which contain such liquid or semi-liquid food products, in particular gelato or ice cream or similar products, to the above-mentioned treatment and distribution machines, as well as to machines which comprise such containers which are connected to them by means of the connectors in question.

It is known that in the distribution to the public of liquid or semi-liquid food products, such as gelato or ice cream or similar products such as sorbet, use is often made of machines that are set up especially for that purpose, even for operation in self-service mode. In such machines a pump takes the product to be distributed from a suitable container and sends the product to a distribution device, accessible on the outside, from which the product is inserted in a vessel for consumption.

By means of the distribution device, the user selects the amount of product required, for example by acting on a distribution lever or on buttons that prepare the amount of product to be distributed. The distribution device then activates the pump, usually a peristaltic pump, for the time necessary to distribute the amount required.

In some more complex machines, interposed between the pump and the distribution device, there is a product treatment chamber, in which a stirring device is located and operates.

In use, it reproduces what is technically defined as a "batch freezer", that is to say, a device which simultaneously cools and stirs the basic mix of the product being distributed.

In both cases, the containers from which the pump takes the product are bags, which are made of plastic material, suitable for use with the food product, and are sealed and provided with an aperture in which a product release inlet is inserted. The inlet is closed by a cap that screws onto the outer threading of the inlet.

The bags can contain the finished product, if the machine simply distributes the product, without further treatment. The machine comprises a refrigerated compartment, in which the bag is placed, if necessary contained inside a rigid supporting structure.

The pump, which, as already indicated, is preferably of the peristaltic type, is connected to the bag aperture inlet by means of a tube, along which a non-return valve is positioned, equipped with a suitable connector that couples to the inlet once the cap has been removed.

In the other type of machine, which not only distributes but also processes the product, for example performing batch freezing, in the bag, or in the bags if there are two or more, there is a "basic" material, which will then be sent by the pump into the treatment chamber, before being distributed.

In the case of a gelato distributing machine, the chamber is equipped with a refrigerating thermal apparatus (but it could be a heating apparatus with reference to other products). In use, a coil is wound on the walls of the chamber and controlled by cooling equipment. The stirring device, for example with radial blades, provided inside the chamber, is driven to rotate by an electric motor.

Both in the case of the machine that simply distributes the product, and in the case of the machine that also carries out the treatment of the product before distribution, a critical operating aspect of the machine and correct product preservation is the temperature, which must be constantly monitored.

At present, this task is relegated to the refrigerated compartment, but there is no direct check of the product temperature in the bag and at the moment when it is released from the bag.

SUMMARY OF THE INVENTION

The aim of this invention is to propose a connector for connecting the bag to the pump of a machine for the distribution or for the treatment and distribution of liquid or semi-liquid food products that allows this information to be obtained, at any time from when the bag has been placed in the machine to the moment when the product is released from the bag.

Another aim of this invention is to propose an assembly formed by the bag intended to contain the product to be distributed, if necessary after it has been subjected to a thermal treatment and remixing, and by the connector associated with it for connecting it to the pump of a machine for the distribution or for the treatment and distribution of liquid or semi-liquid food products.

A further aim of this invention is to provide a machine for the distribution or for the treatment and distribution of liquid or semi-liquid food products that is equipped with the connector to be applied to the bag for connecting it to the machine pump.

Finally, this invention has for an aim to provide the components listed above, made with a simple but effective solution that does not have a significant and negative impact on the production of the components.

These and other aims that will become apparent in the following description, are all achieved by a connector for connecting a container as described in the appended claims.

BRIEF DESCRIPTION OF THE DRAWINGS

The characteristics of the invention that do not emerge from what has been said above will become apparent in the following description, to be considered with reference to the appended drawings, in which:

FIG. 3 shows a section of bag in which the product release aperture is made and which supports the inlet with the closing cap;

FIGS. 4 and 5 show the same section of bag as FIG. 3 with the connector applied and connected to the machine pump, respectively in a whole view and in cross-section;

FIGS. 6 and 7 show two types of machine, respectively for the distribution and for the treatment and distribution of liquid or semi-liquid products, equipped with the connector applied to the bag placed in the machine;

DESCRIPTION OF THE PREFERRED EMBODIMENTS

Figure 2:
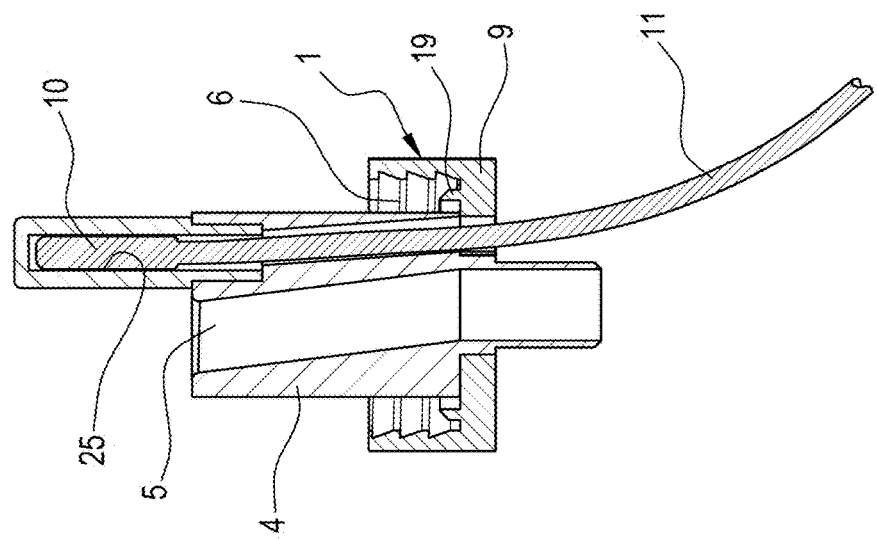
FIG. 2 is a cross-section of the connector of FIG. 1 according to a longitudinal cutting plane.

With reference to the above-mentioned figures, the numeral 1 denotes a connector for connecting a container 2 to a machine 3, 23 for the distribution or respectively the treatment and subsequent distribution of a liquid or semi-liquid food product, the container being placed in a refrigerated compartment A of the self-same machine.

The function of the container is to contain the liquid or semi-liquid food product to be supplied to the machine 3, 23.

The container is preferably a deformable bag 2, made of material suitable for use with the food products that it must contain.

In one section of the bag 2 a product release aperture is made (FIG. 3), at which an inlet 7 is applied.

The inlet 7 preferably externally bears a threading 17, with which it engages with a closing cap 27.

The connector 1 is formed by a body 4 with an opening 5 passing therethrough, set up to allow the product to pass through the connector.

Around the body 4 there is a bell-shaped outer portion 9, which surrounds the body 4 and bears connecting means 6 on its inner wall.

The connecting means 6 are preferably a threading 19, intended to screw onto the threading 17 of the inlet 7.

The opposite side of the connector 1 to the inlet 7 is connected, by means of a flexible duct 21 (FIGS. 4 and 5) to the machine 3, and in particular to pump means 13 formed by a peristaltic pump.

More preferably, the duct is defined by a deformable pipe (preferably made of plastic material).

The flexible duct 21 is inserted in said peristaltic pump.

The function of the pump is to withdraw selected amounts of the liquid or semi-liquid product and to send those selected amounts to a liquid or semi-liquid product distribution device 8, which is normally located on the outside of the casing of the machine 3.

In this way, the distribution device can be controlled by the user for selecting the desired amount of product, by acting, as in the example illustrated, on a control device (mechanical or electromechanical).

Obviously, there may be various control means for the distribution device, such as buttons or knobs, not illustrated in the figures.

From the distribution device the product is inserted in a vessel 20 which the user will pick up, or which the user holds during distribution, so that he or she can then consume the product.

According to this invention, the connector 1 also comprises a thermal sensor 10, which is supported by the body 4 in such a way that it is positioned inside the container 2, in contact (thermal or physical) with the liquid or semi-liquid product. Connected to the sensor 10 there is a connecting cable 11 which comes out of the end of the body 4 which remains outside the bag 2 and which then connects to the circuitry of the machine control device (not illustrated) for providing it with the information about the temperature detected in the bag 2.

Therefore, the control device is configured for detecting a temperature signal, by means of said sensor 10.

In use, there is a second through opening 25, extending parallel or almost parallel to the product transit opening 5. The sensor 10 is inserted and fixed in the second opening 25 and protrudes from the side of the body 4 intended to be inserted in the inlet 7 of the bag 2. The connecting cable 11 originates from the end of the sensor 10 which remains closed in the second opening 25, and passes through the latter until it comes out of the side of the outer body 4 that is external with respect to the bag 2.

The bag 2 and the connector 1 configured in this way thereby form a container—connector assembly, according to the invention, which is able to (constantly) inform the control device about the temperature of the product in the bag, thanks to the sensor 10 which is always located stretched out inside it.

In the different type of machines 23, which also perform treatment of the product, or products, before distributing them, there is also a thermal treatment chamber 12 for the liquid or semi-liquid food product or for the liquid or semi-liquid food products. The chamber 12 is located between the pump 13 and the distribution device 8. In use, a thermal apparatus is operatively associated with the chamber 12 so as to carry out the heat treatment on the liquid or semi-liquid product or liquid or semi-liquid products inside said chamber 12. In particular, the thermal apparatus comprises cooling equipment (not illustrated in the figures) with a coil surrounding the chamber 12. Moreover, a stirring device 14 for stirring the liquid or semi-liquid product or liquid or semi-liquid products, is located and operates inside the heat treatment chamber 12.

The combination of the heat treatment and the operation of the stirring device produce the procedure known as churning, required above all in the preparation of gelato, ice cream, sorbets and the like.

Figure 1:
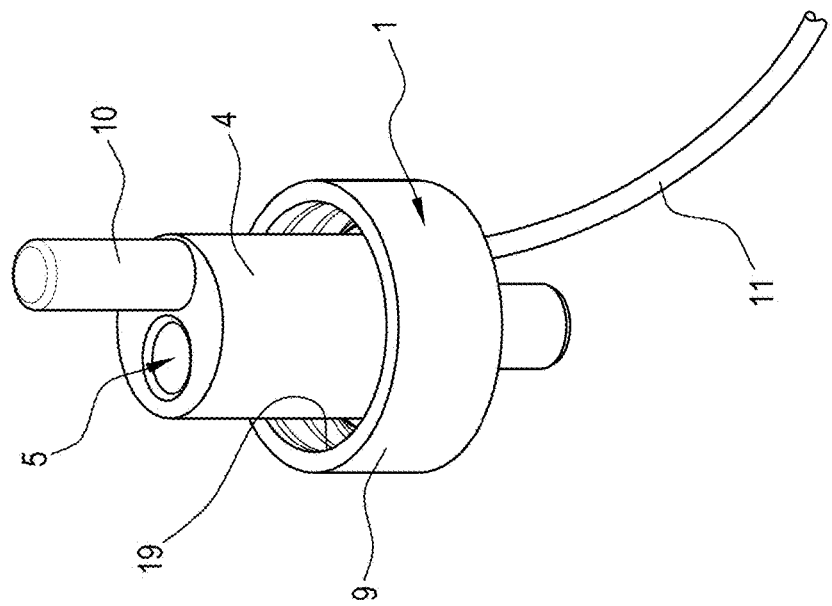
FIG. 1 is a detailed illustration of the connector according to this invention.
Figure 6:
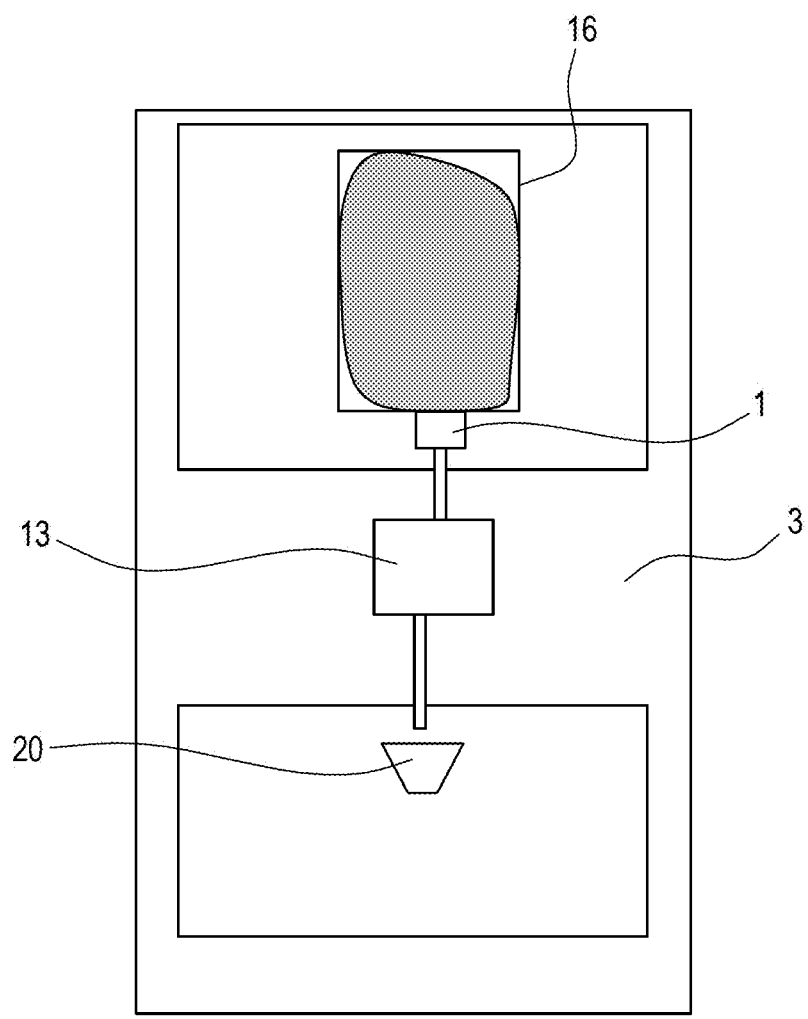

According to a special set-up, the bag 2 is located in a position lower than the pump 13 (FIG. 2) whilst in another different set-up, the bag 2 is in a position higher than the pump 13 (FIG. 1).

In both cases, there may be a valve 15 (which can be opened and closed) interposed between the pump 13 and the bag 2.

Finally, according to an advantageous alternative embodiment, when it is associated with the machine 3, 23 the bag 2 is placed in a refrigerated compartment A and contained in a rigid supporting structure 16. This structure holds the bag in a neat, supported way, so that it avoids resting directly on the inner walls of the refrigerated compartment A.

Obviously, the invention described herein achieves all of the aims indicated.

The connector proposed, due to the presence of the sensor always located in the bag, allows the actual temperature of the product to be obtained, continuously and at any time, from when the bag is placed in the machine until the product is released from it.

Basically, an assembly is created, which is formed by the bag 2 intended to contain the product to be distributed, if necessary after it has been subjected to a heat treatment and remixing (churning), and by the connector associated with it which allows continuous monitoring of the temperature of the product.

These characteristics allow the production of a machine for the distribution or for the treatment and distribution of liquid or semi-liquid food products that is equipped with the connector described above, to be applied to the bag for connecting it to the machine pump.

Finally, the components listed above are made with a simple but effective solution that does not have a significant and negative impact on the costs for production of the components.

Figure 8:
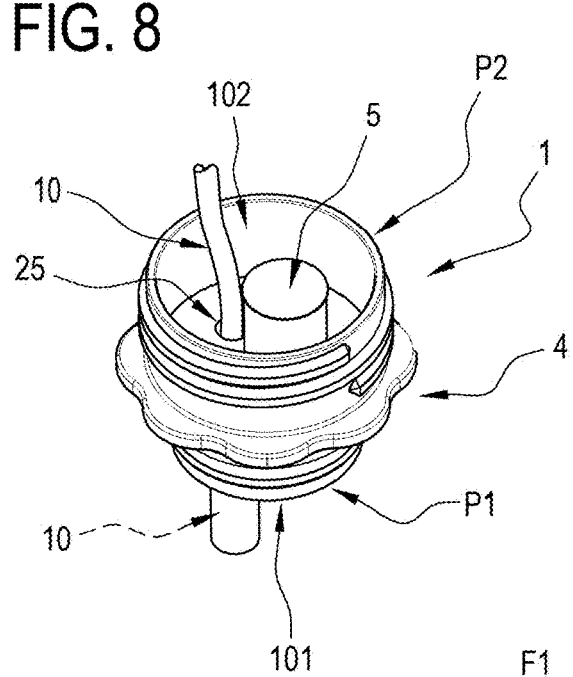
FIGS. 8 to 10 show a further embodiment of the connector according to this invention.
Figure 9:
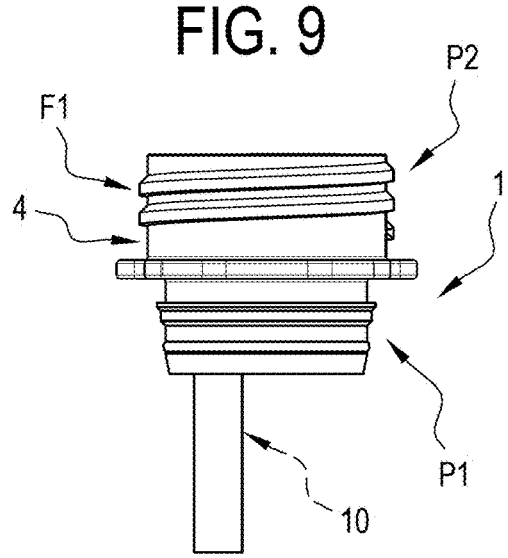
Figure 10:
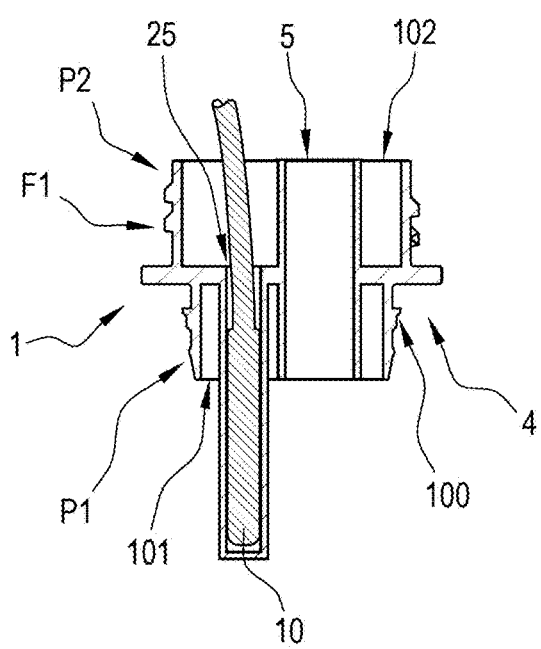

FIGS. 8 to 10 show a further alternative embodiment of the connector 1.

According to that alternative embodiment, the body 4 is (substantially immovably) coupled to the bag 2. It should be noticed that according to that alternative embodiment the connector 1 is an integral part of the bag 2, that is to say, it is disposed of together with the bag.

Preferably, the sensor 10 is removable from the body 4.

More precisely, a coupling portion P1 of the body 4 is inserted in the bag 2.

It should be noticed that, in this way, the sensor 10 is located inside the bag 2 during use.

The portion P2 of the body 4 is, in contrast, facing outside the bag 2. It should be noticed that said second portion P2 of the body 4 preferably comprises a threaded part F1.

The threaded part F1 is suitable for coupling with a cap (not illustrated).

In contrast, the coupling portion P1 is equipped with at least one tooth 100 suitable for locking with an outfeed opening of the bag 2. In this way, by means of the coupling portion P1, effective, sealed coupling is guaranteed between the bag 2 and the connector 1 (and immovable due to the coupling with the tooth 100).

According to another aspect, said threading F1 is an outer threading.

According to another aspect, said first coupling portion P1 comprises a first internal cavity 102 and said second portion P2 comprises a second internal cavity 102.

It should be noticed that, advantageously, that connector 1 in the embodiments in FIGS. 8 to 10 is substituted together with the bag 2: in this way, the bag container assembly is particularly hygienic.

What is claimed is:

1. A system comprising a connector for connecting at least one container, adapted to contain a liquid or semi-liquid product, to a machine which is to receive the liquid or semi-liquid product, said connector including a body provided with an opening passing through the body, said opening providing fluid communication of the liquid or semi-liquid product to the machine, said connector connected to the machine by connecting means configured to connect with an inlet of the machine through which the liquid or semi-liquid product associated to said at least one container is released, wherein said connector includes a thermal sensor positioned inside said at least one container.

2. The system according to claim 1, wherein the thermal sensor is supported to be positioned, in use, inside said at least one container in contact with said liquid or semi- liquid product, when said at least one container is coupled to the machine by the connecting means.

3. The system according to claim 1, wherein said sensor is fastened to said body so as to project inwards of the at least one container and protrudes with a connection cable from an end intended to remain outside the at least one container.

4. The system according to claim 3, wherein the body includes a second through opening, extending parallel to said opening, with said sensor being positioned and fixed in said second opening so as to protrude from a side of said body aimed at entering the inlet of said bag, and with a connecting cable which originates from an end of the sensor, intended to remain closed inside the second opening, and extending through the second opening until the connecting cable exits from a side of said body external to the bag.

5. The system according to claim 1, wherein said connecting means includes a threading made on an inner wall of a bell-shaped outer portion of the connector and configured for engagement with a corresponding threading made on an outer part of said inlet of the at least one container.

6. The system according to claim 1, wherein said body includes a portion which couples with said bag and a portion provided with a threading.

7. The system according to claim 6, wherein said threading is an outer threading.

8. The system according to claim 1, wherein the connector further comprises a first coupling portion that includes a first internal cavity and a second portion that includes a second internal cavity.

9. The system according to claim 1, wherein said at least one container is formed by a deformable bag, provided with an aperture, from which the liquid or semi-liquid product is released.

10. The system according to claim 9, wherein said bag is made of a material suitable for food that is to be supplied to said machine.

11. The system according to claim 9, wherein said inlet protrudes outwards from said bag and includes an outer threading adapted to couple with a corresponding threading made on an inner part of an outermost bell-like portion of said connector.

12. The system according to claim 1, further comprising:
at least one distribution device for the liquid or semi-liquid product which can be controlled from outside of the machine to distribute a selected amount of said liquid or semi-liquid product;
pump means, connected with an inlet to said at least one container, so as to withdraw the selected amount of said liquid or semi-liquid product, and with an outlet to said at least one distribution device, so as to send to the at least one distribution device said selected amount of liquid or semi-liquid product;
wherein said at least one container is formed by a deformable bag made of a material suitable for food, said bag including an aperture from which the liquid or semi-liquid product is released, and to which an inlet of the machine is applied.

13. The system according to claim 1, further comprising:
at least one distribution device for the liquid or semi-liquid product which can be controlled from outside of the machine to distribute a selected amount of said liquid or semi-liquid product;
pump means, connected with an inlet to said at least one container, so as to withdraw the selected amount of said liquid or semi-liquid product, and with an outlet to said at least one distribution device, so as to send to the at least one distribution device said selected amount of liquid or semi-liquid product;
at least one chamber for heat treatment of said liquid or semi-liquid product, situated between said pump and said at least one distribution device;
at least one stirring device of said liquid or semi-liquid product situated and working inside said at least one chamber for heat treatment;
a heating apparatus associated operationally to said at least one chamber for heat treatment so as to carry out a heat treatment of the liquid or semi-liquid product inside said at least one chamber for heat treatment;
wherein said at least one container is formed by a deformable bag made of a material suitable for food, said bag including an aperture from which the liquid or semi-liquid product is released and to which an inlet of the machine is applied.

14. The system according to claim 13, wherein said heating apparatus includes cooling equipment.

15. The system according to claim 13, wherein said pump means include a pump.

16. The system according to claim 13, wherein said pump means include a peristaltic pump.

17. The system according to claim 13, wherein said at least one container is situated at a position lower than said pump.

18. The system according to claim 13, wherein said pump means include a pump comprising at least one valve interposed between said pump and said at least one container.

19. The system according to claim 13, wherein said bag, when connected to said machine, is contained inside a rigid supporting structure.

* * * * *